United States Patent [19]

Pimley

[11] Patent Number: 4,538,767
[45] Date of Patent: Sep. 3, 1985

[54] APPARATUS FOR RECOVERING PAPER-MAKING FIBER FROM CONTAMINATED WASTE PAPER PRODUCTS

[75] Inventor: John J. Pimley, Pontypool, Wales

[73] Assignee: The Black Clawson Company, Middletown, Ohio

[21] Appl. No.: 675,254

[22] Filed: Nov. 27, 1984

Related U.S. Application Data

[63] Continuation of Ser. No. 409,223, Aug. 18, 1982, abandoned.

[30] Foreign Application Priority Data

Aug. 20, 1981 [GB] United Kingdom ............... 8125510

[51] Int. Cl.³ ............................................. B02C 13/13
[52] U.S. Cl. .................................. 241/79.3; 209/270; 209/298; 241/62
[58] Field of Search ..................... 241/46.02, 46.08, 62, 241/86.1, 74, 91, 79.3, 278 A, 299, 284, 275, 80; 209/296, 298, 270, 280, 45, 49

[56] References Cited

U.S. PATENT DOCUMENTS

| | | | |
|---|---|---|---|
| 1,500,170 | 7/1924 | Werner | 241/299 |
| 2,060,685 | 11/1936 | Murphy | 241/80 |
| 2,846,153 | 8/1958 | Krogh | 241/62 |
| 3,507,387 | 4/1970 | Alldred, Jr. et al. | 209/45 |
| 3,931,937 | 1/1976 | Hahn et al. | 241/74 |
| 4,124,168 | 11/1978 | Bialski et al. | 241/74 X |
| 4,382,559 | 5/1983 | Hellberg | 241/79.3 |

FOREIGN PATENT DOCUMENTS 234968 6/1925 United Kingdom ............... 209/299

Primary Examiner—Howard N. Goldberg
Assistant Examiner—Joseph M. Gorski
Attorney, Agent, or Firm—Biebel, French & Nauman

[57] ABSTRACT

A system for the recovery of paper-making fiber from contaminated waste paper products including plastic film and other lightweight non-paper contaminants includes a novel rotary screening machine comprising a perforated drum rotatable about a generally horizontal axis and having openings at opposite ends for the delivery of liquid and paper furnished to the drum and the discharge of contaminants, respectively, a plurality of vanes for lifting material from the bottom of the drum to an upper region as the drum rotates, and a rotor mounted within the drum and having blades which are disposed in spaced relation to the drum vanes in a position to intercept material falling from the upper region of the drum and fling it back against the drum. The resulting fibers or flakes of useful paper are washed through the drum perforations while the rejected contaminants are conveyed to and removed via the discharge end of the drum.

6 Claims, 5 Drawing Figures

APPARATUS FOR RECOVERING PAPER-MAKING FIBER FROM CONTAMINATED WASTE PAPER PRODUCTS

CROSS REFERENCE TO PENDING APPLICATION

This application is a continuation of application Ser. No. 409,223, filed Aug. 18, 1982 and now abandoned.

BACKGROUND OF THE INVENTION

This invention relates to the pulping of waste paper products for the recovery of reusable paper-making fibers therefrom and, more particularly, to methods and apparatus for recovering reusable paper-making fiber from waste paper products containing junk or contaminants.

A problem of increasing magnitude in the pulping of waste paper products has been the steady increase in the amount and nature of the contaminants mixed therewith in commercially obtainable waste paper, the contaminants now commonly averaging of the order of 15% by weight. Of particular importance is the amount of lightweight contaminant junk, primarily in the form of plastics products of many kinds and especially plastics sheet and film and also pieces of plastics foam.

In the past, many of the common contaminants of waste paper could be eliminated from the pulper tub by the use of a junk remover, a typical example being shown in British patent specification No. 1,266,420. Such a junk remover relies on gravity discharge, through a downward chute from the pulper tub, of iron and other junk material of substantially higher specific gravity than paper fibers. But such junk removers have proved to be ineffective for removing lightweight junk for two principal reasons.

One reason is the obvious one that material lighter than water will not readily flow down the chute which connects a pulper tub with its junk remover. The other is that the normal operation of a pulper rotor tends to force sufficient liquid from the tub to the junk remover when the pulping operation commences to maintain a higher static head in the junk remover than in the tub, commonly of the order of 60 or more centimeters (two or more feet). Further, the common practice is to add fresh liquid to the tub by way of the junk remover in order to wash fiber back into the tub from the high specific gravity pieces travelling through the chute from the tub, and this increases the opposite to the flow of light materials from the tub.

The result of these conditions is that when a waste paper pulper—whether or not it is equipped with a junk remover—is operated on a continuous basis, with continuous extraction, through a perforate extraction plate, of a slurry of sufficiently small particle size, and continuous replacement of water and furnish, plastics tend to accumulate in the tub until the amount of extracted fiber drops below an acceptable rate, a condition which the industry calls "constipated". It is then necessary to discontinue pulping and manually empty the accumulated junk from the tub.

The development of this condition has three significant disadvantages. Running of the pulper until the paper fiber can no longer be extracted not only results in loss of production of recovered paper fiber but also produces increased an unnecessary wear on the pulper rotor and its extraction plate. In addition, its results in extraction of a substantial amount of small plastics particles with the paper fiber, as the quantity of plastics in the tub increases to the point where it comes into contact with the rotor, and such small pieces of plastics are difficult to separate from the paper fiber, especially if the holes in the extraction plate are small. At the same time, manual emptying of accumulated plastics is expensive and time consuming, and it also results in the loss of a substantial amount of fiber which remains commingled with the plastics and is therefore eliminated along with the plastics.

British patent specification No. 1,547,284 taught that these disadvantages of past practice can be overcome, and the effectiveness of the junk remover greatly improved, by maintaining the liquid level in the junk remover lower than in the pulper tub and thereby inducing liquid flow from the tub into the junk remover. In accordance with that specification, this is done by connecting the inlet of a pump to the junk remover casing at a level below the minimum operating level in the tub, and withdrawing liquid from the junk remover and recirculating it back to the tub under controlled conditions establishing the desired lower liquid level in the junk remover than in the tub, e.g. lower by about a few centimeters or inches.

The effect of this removal of the normal static head conditions is firstly to induce flow through the chute from the tub into the junk remover. Lightweight trash circulating in the tub will be entrained in that flow and, as soon as it enters the junk remover, it will rise to the top and thus be trapped against return to the tub. The resulting accumulation of lightweight trash at the top of the liquid in the junk remover is lifted out for removal by the perforated conveyor buckets which are standard equipment in a junk remover.

Another solution to the problem, taught in U.S. Pat. No. 4,129,259, lies in the provision of a system operating in combination with a pulper and junk remover wherein the plastics and other lightweight trash picked up by the junk remover conveyor buckets is dumped into a junk box which is continually filled with liquid to a sufficient level to float lightweight trash over a weir leading to a hopper. Detrasher means, in the form of very coarse straining means, such as a grid of tine-like members, is positioned in the path of the overflow from the weir into the hopper, with the tines being so spaced with respect to each other, and at such angle to the horizontal, that they will permit the passage of most of the plastics sheet and similar contaminant material but will shunt large pieces of floating trash, such as particularly chunks of wood or plastics, to a separate receiver.

The material passing through the detrasher grid may be returned directly to the pulper tub for further defibering, or may first be subjected to a deflaking operation, which may be done by a pump capable of such action or by a deflaker in conjunction with a pump capable of handling a fluid flow containing substantial quantities of solids. The output of the deflaking section of the system is then preferably screened to reject large plastics pieces and the like, with the accepts flow from such screening being returned to the pulper tub for further defibering.

SUMMARY OF THE INVENTION

It is an object of the present invention to provide a new and improved method and apparatus for recovering paper-making fiber from contaminated waste paper products, including plastics film and other lightweight non-paper contaminants, which do not utilize a mechanical system for the removal of the contaminants and which require a minimum amount of operating power. Other objects of the invention are to provide such a method and apparatus in which the removal of contaminants is unaffected by variations of the liquid level in the pulper tub and in which the junk removing equipment is maintainable without stopping the rotor of the pulper.

From one aspect, the present invention consists in a method of recovering paper-making fiber from contaminated waste paper products including plastics film and other lightweight non-paper contaminants, including the steps of pulping the waste paper in a pulper including a tub for containing the waste paper products and liquid, and a rotor mounted within the tub for pulping the waste paper products to liquid slurry form, discharging contaminants in the tub, together with liquid, through a junk outlet disposed adjacent the periphery of the rotor and into a junk remover connected to the junk outlet and inducing a flow of lightweight contaminants through the junk outlet and into the junk remover for removal therefrom, characterised in that the flow of lightweight contaminants is induced by controlling the level of an adjustable weir in the junk remover adjacent the top thereof to maintain a liquid flow over the weir, and liquid and lightweight contaminants are permitted to flow or float upwardly in the junk remover to the weir for discharge thereover.

Downstream of the weir, lightweight contaminants may be separated from the liquid and accompanying waste paper products and the slurry of waste paper products may then be recirculated to the tub. During this separating operation, the waste paper products contained in the slurry may be subjected to a defibering or deflaking process before being recirculated to the pulper tub. The heavy contaminants, which do not float and which are propelled through the junk opening by the rotor, may be removed from the junk remover via a junk collector in the bottom of the junk remover. This collector may be adapted to be emptied periodically.

From another aspect, the present invention consists in apparatus for recovering paper-making fiber from contaminated waste paper products including plastics film and other lightweight non-paper contaminants, including a pulper comprising a tub for containing the waste paper products and liquid, and a rotor mounted in the tub for pulping the waste paper products to liquid slurry form, a junk outlet opening disposed adjacent the periphery of the rotor, a junk remover connected to the junk outlet opening, and means for inducing a flow of lightweight contaminants through the junk outlet opening into the junk remover for removal therefrom, characterised by an adjustable weir in the junk remover adjacent the top thereof over which liquid and lightweight contaminants can flow for discharge from the junk remover, and means for controlling the level of the weir so as to maintain liquid flow over the weir and induce flow of lightweight contaminants through the junk outlet opening to the junk remover.

A junk collector for heavy, non-floating contaminants may be located at the bottom of the junk remover and a passageway connecting the junk remover to the junk outlet opening may include a chute portion leading to the junk collector. The latter may be arranged to be emptied periodically.

Preferably, the liquid flow over the weir is arranged to be delivered to screening apparatus, for example, a rotary screening machine, which is designed to separate paper-making fiber and other smaller particles or flakes from whatever large contaminants are discharged in the liquid or slurry flow over the weir, and such accepts from the screening apparatus are returned to the pulper tub.

A known rotary screening machine for treating waste paper slurry and separating paper-making fibers from plastics and other contaminants comprises a perforated rotating drum having a series of lifting baffles or vanes extending along the inside surface of the drum. Wet waste paper furnish or slurry to be treated is delivered to one end of the drum and is continuously lifted by the vanes from a bottom region of the drum to an upper region from where it falls back to the bottom of the drum. The repeated dropping of the slurry material disintegrates the fibrous paper material and the resulting fibers are washed through the drum perforations for further processing. The rejected plastics material and other contaminants are transported to the opposite end of the drum by the movement of the vanes, which are preferably of spiral shape, from where they are discharged. Whilst such a rotary machine works satisfactorily, in order to defiber Kraft sack or mild wet strength papers, a large number of impacts are required within the drum, requiring a drum of excessive length. Heavily wet strengthened papers are rejected even with a long drum.

A further object of the present invention is to provide a new and improved rotary screening machine which is capable of defibering or deflaking waste paper or other paper stock and which separates the fibers or flakes of paper from plastics film or other contaminants in the stock without comminuting the plastics and other contaminants. Hence, according to a further aspect of the invention a rotary screening machine comprising a perforated drum, preferably, of frusto-conical shape, which is mounted for rotation about a horizontal axis or an axis slightly inclined to the horizontal, and which has openings at opposite ends for the delivery of liquid and paper furnish to the drum and the removal of contaminants therefrom, and which has a plurality of spaced vanes extending along its inside surface for lifting furnish material from a bottom region of the drum to an upper region of the drum, as it rotates, from which upper region the material falls downwardly, is characterised by a rotor disposed within and extending along the drum, said rotor having radially projecting blades extending axially therealong and being disposed with its blades in spaced relation to the drum vanes in a position to intercept the material falling from the upper region of the drum, whereby to impact such material and defiber or deflake the paper. The fibers or flakes of useful paper are washed through the drum perforations and the rejected contaminants, which may include plastics sheet or film, are conveyed to the discharge end of the drum by the rotation of the latter and the vanes, which may be of spiral configuration. Sprays may be provided, for example, above the drum, to assist in washing the defibered or deflaked material through the drum perforations. The retention time of the material within the drum, and hence, the degree of processing can be varied by adjusting the inclination of the drum axis.

With the rotary screening machine according to the invention, the rotor within the drum vastly increases the number of impacts to which the slurry material is subjected during its travel through the drum. As a result, the paper is rapidly defibered or deflaked and this enables the length of the drum to be kept to a minimum whilst permitting satisfactory recovery of paper-making fibers or flakes, even from wet strength papers. As the rotor is arranged simply to impact the slurry and not to produce shear forces between the rotor blades and the drum vanes, there is little or no communution or cutting of plastics material or other contaminants in the slurry and the power required by the rotor is minimized. As the plastics contaminants are not cut, the amount of small plastics pieces which can pass through the drum perforations with the paper fibers or flakes is reduced so that such accepts are cleaner. Moreover, since there is no comminution of the contaminants, which would permit contaminants to flow through the drum perforations with the paper fiber or flakes, the drum perforations may be of larger diameter than hitherto.

BRIEF DESCRIPTION OF THE DRAWINGS

In order that the present invention may be more readily understood, reference will now be made to the accompanying drawings in which.

DESCRIPTION OF THE PREFERRED EMBODIMENTS

Figure 1:
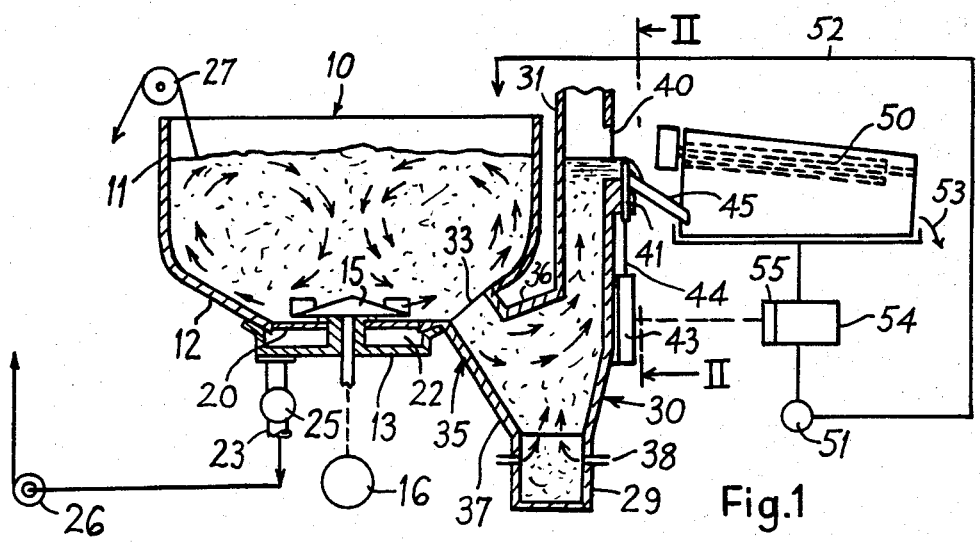
FIG. 1 is a somewhat diagrammatic view generally in vertical section showing waste paper pulping apparatus embodying the invention.
Figure 2:
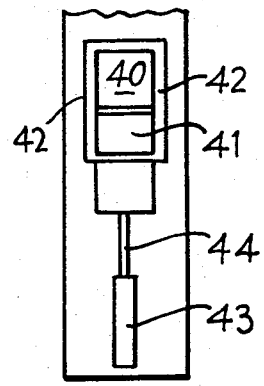
FIG. 2 is a fragmentary view along the line II—II of FIG. 1.

In FIG. 1, the pulper is generally of the construction disclosed in U.S. Pat. No. 3,339,851, and includes a tub 10 defined by a cylindrical upper wall 11, and inwardly tapered lower wall portion 12, and a bottom wall 13. The rotor 15 is mounted for rotation on a vertical axis in the bottom of the tub and has a drive 16. A perforated extraction plate 20 positioned under the rotor 15 defines, with the bottom wall 13 a chamber 22. For preferred results, the extraction plate 20 has relatively small perforations, e.g. 3 to 4.75 mms (⅛ to 3/16 inch) in diameter, and a discharge line 23 provided with a control valve 25 conducts stock extracted through plate 20 from chamber 22 and to pump 26 and the next station in the system. Usually, the pulper will be equipped with a ragger, indicated at 27, for removing materials such as wire and rope from the tub.

The junk remover indicated at 30 comprises a casing or tower 31 disposed adjacent the side of the tub 10 and extending from a position below the tub to a position at least as high as or higher than the tub. The latter has an outlet opening 33 located adjacent the periphery of the rotor 15, in its tapered wall portion 12. This outlet opening is connected to the junk remover tower 31 by a chute 35 having upwardly and downwardly inclined top and bottom walls 36 and 37. It is of rectangular shape in plan with its bottom edge disposed generally in the same plane as the bottom surface of the rotor. The bottom of the tower 31 defines a junk boot or collecting box 29 which is provided with the usual clean-out door (not shown), and also with a water inlet connection 38.

In the upper portion of the tower 31, adjacent the normal liquid level in the pulper tub, is an overflow, discharge opening 40 controlled by an adjustable weir comprising a weir plate 41 vertically slidable in suitable supporting guides 42 attached to the wall of the tower adjacent to the opening 40. The liquid flowing over the weir plate 41 is delivered by a chute 45 to the inlet end of a rotary screening machine 50 according to the invention and which is designed to separate paper fibers or flakes from whatever large pieces of plastics and other light trash float over the weir plate 41. The accepts from the machine 50 are collected in an accepts tank 54 and are returned by a pump 51 and line 52 to the pulper tub, and the rejects are discharged from the opposite end of the machine 50, as indicated by the arrow 53.

The weir plate 41 is controlled by a fluid pressure cylinder 43 mounted on the tower 31 and having its piston rod 44 connected to the plate 41. The supply of fluid pressure to the cylinder 43 is controlled by a suitable level sensor 55, such as, a differential pressure cell, which is positioned in the accepts tank 54 and causes the cylinder 43 to adjust the plate 41 to maintain a flow of liquid thereover. Whilst it is positioned in the accepts tank 54 for reasons of sensitivity, although it may equally be positioned elsewhere, the sensor 55 is, in effect, responsive to the liquid level in the pulper tub 10. Hence, when the sensor 55 detects a fall in the accepts tank liquid level, this signals an insufficient flow of liquid over the weir plate 41, resulting from the latter being too high with respect to the liquid level in the pulper tub, and the weir plate is lowered to increase the flow, and vice versa.

Figure 3:
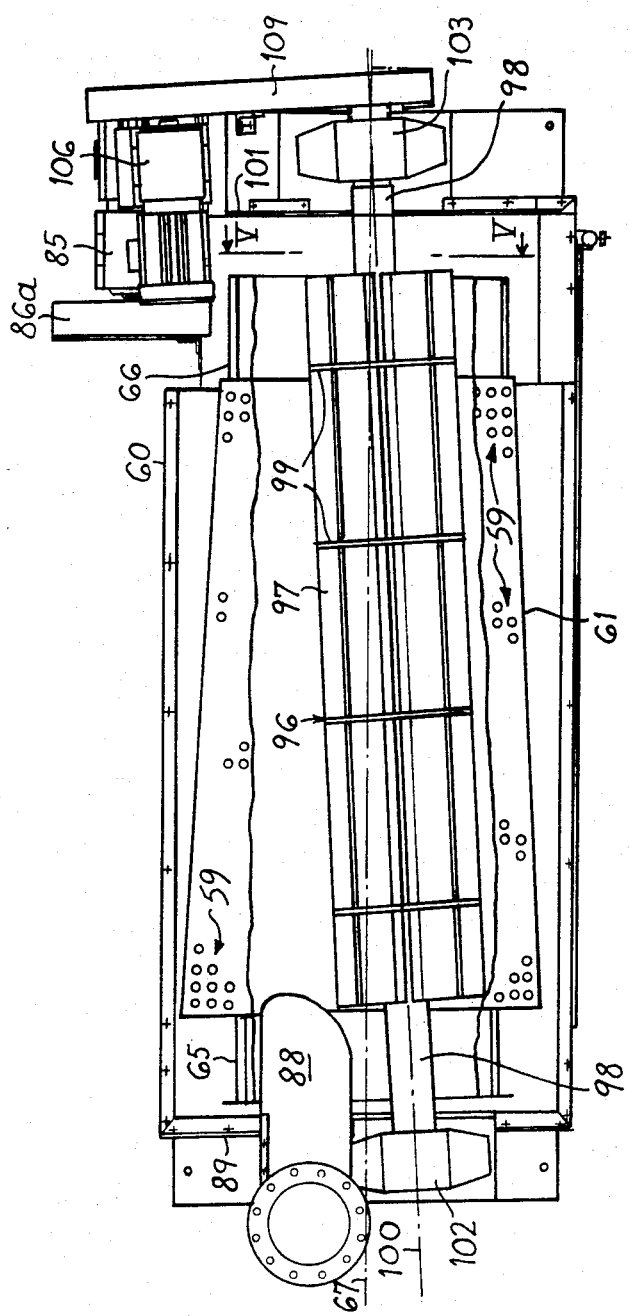
FIG. 3 is a somewhat diagrammatic plan view of a rotary screening machine according to the invention and capable of being utilized in the apparatus illustrated in FIG. 1; the top part of the machine casing is removed and the drum is partially broken away to illustrate the rotor.
Figure 4:
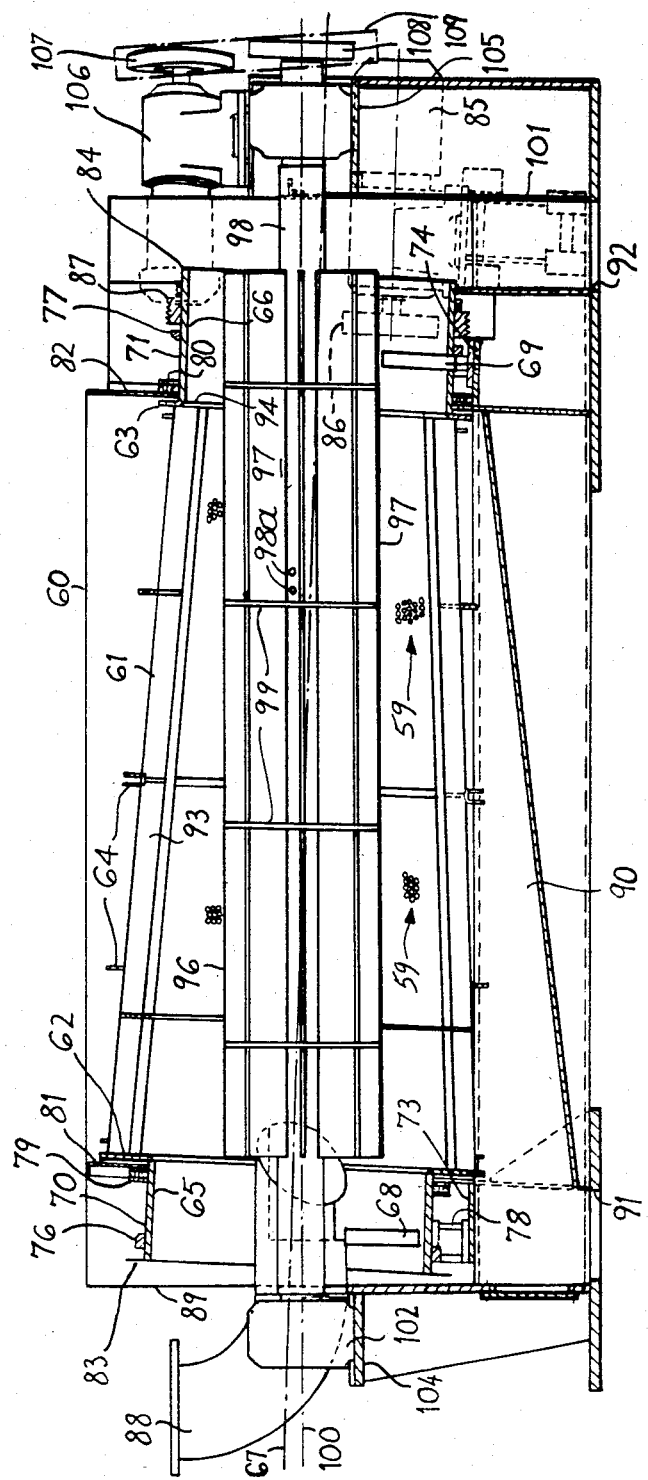
FIG. 4 is an enlarged vertical section through the machine of FIG. 3.
Figure 5:
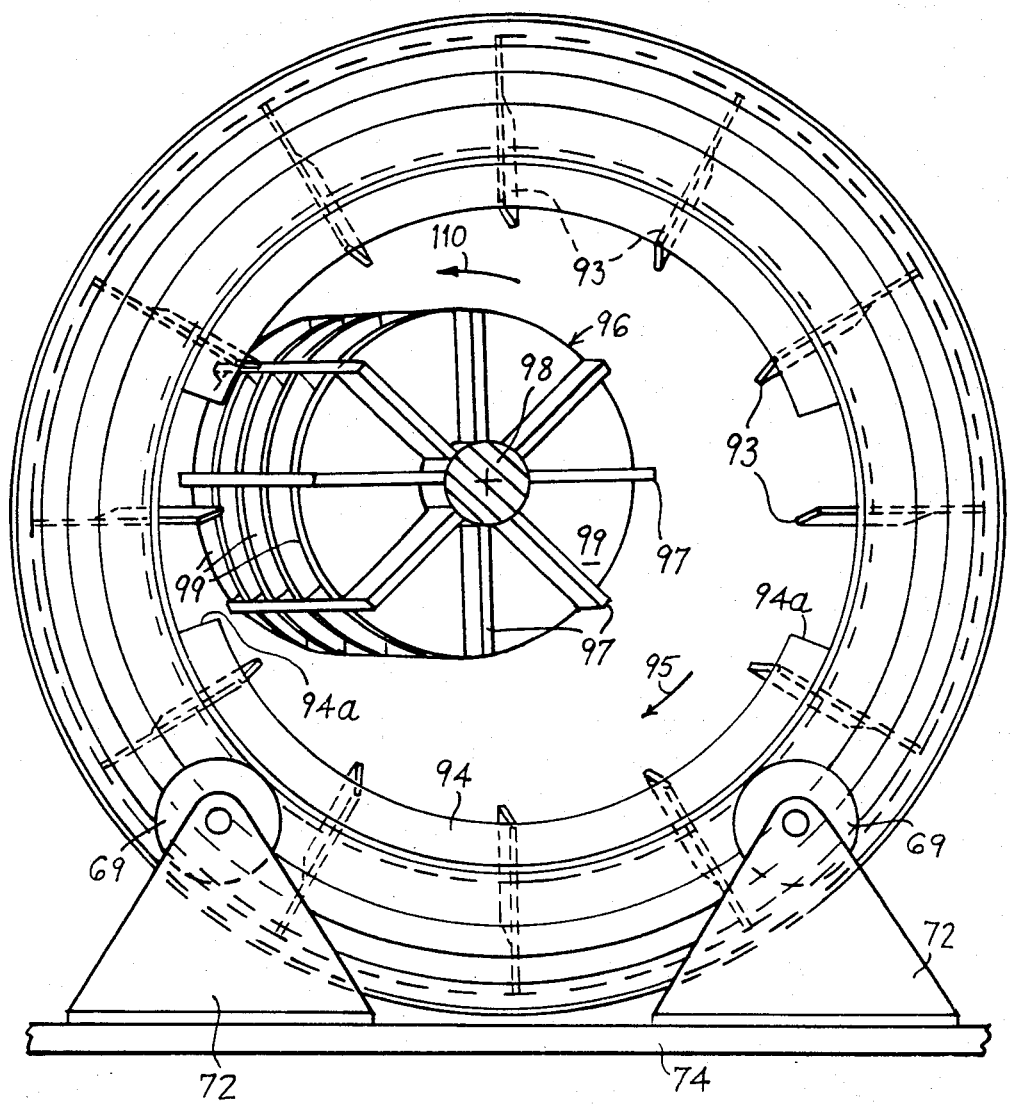
FIG. 5 is a diagrammatic end view, on a still further enlarged scale, of the drum and rotor taken along the line V—V of FIG. 3 and also illustrates the adjacent pair of mounting wheels for the drum.

The rotary screening machine 50 is illustrated in detail in FIGS. 3, 4 and 5. It comprises a casing 60 in which is rotatably mounted a perforated drum 61. The drum is of frusto-conical shape, having an angle of taper of, for example, 3° 25' with respect to the perpendicular to its base, and has perforations 59 over its entire extent which are typically 25 mm (1 inch) in diameter. It has annular end walls 62,63 and is reinforced along its length by external annular stiffening flanges 64. Hollow cylindrical extensions 65,66 project from the end walls 62,63, and the drum is mounted for rotation about an axis 67 slightly inclined to the horizontal, for example, at an angle of approximately 3° 25', so that the frusto-conical wall of the drum is substantially horizontal at the bottom of the drum, by two pairs of wheels 68,69 disposed within the casing adjacent opposite ends of the drum, respectively, and engaging tracks 70,71 on the cylindrical extensions 65,66.

The wheels 68,69 are rotatably supported by suitable forks 72 (FIG. 5) upstanding from platforms 73,74 extending across the casing below the cylindrical extensions 65,66. The tracks 70,71 are defined by ring flanges 76,77 secured to the cylindrical extensions, and the wheels 68,69 engage their associated tracks closely adjacent the insides of these ring flanges so as substantially to restrain the drum against axial movement during rotation. Axial movement of the drum is also restrained by a stop member 78 projecting upwardly from the platform 73 and engaging the inside of the ring flange 76 at the larger end of the drum. Annular seal assemblies 79,80 are supported adjacent opposite ends of the drum by inwardly projecting flanges 81,82 of the casing and engage with the external surfaces of the extensions 65,66 inwardly of the mounting wheels 68,69.

Flinger rings 83,84 are secured to the outer ends of the cylindrical extensions to prevent flow of liquid slurry and contaminants along the outside surfaces of the extensions and soiling of the drum mounting wheels and the drum drive. The drum is driven by an electrical motor 85 mounted on the outside of the casing adjacent the small end of the drum and connected to the drum by a pulley and belt transmission. A multigroove pulley 86 fastened to the motor shaft is connected to the cylindrical extension 66 by V-belts 86a engaging about the collar 87 fastened to the extension 66 and having the V-belt grooves in its periphery.

The large end of the drum is its inlet end, and a slurry of waste paper products and contaminants to be treated is fed to the inlet end via an inlet pipe 88 extending through the adjacent end wall 89 of the casing 60 and projecting into the drum through the adjacent cylindrical extension 65. The bottom part of the casing, underlying the drum, serves as a trough 90 for collecting the accepts, that is, liquid and fiber or flakes passing through the drum perforations, and accepts collected in the trough 90 flow to an accepts outlet 91 disposed below the inlet end of the drum from where they are discharged to the accepts tank 54 for recirculation to the pulper tub 10 (FIG. 1) by the pump 51.

The small end of the drum is the discharge end for rejected contaminants. These are discharged from the outer end of the cylindrical extension 66 and fall through a rejects outlet 92 in the bottom of the casing 60.

Mounted on the perforated inner surface of the drum 61 are a plurality of axially extending vanes 93. These project inwardly from the drum at equally spaced positions about the drum and are reinforced by suitable gussets (not shown). They may be formed with a spiral configuration to provide a screw feeding action as the drum rotates. At the discharge end of the drum, the vanes terminate at an annular baffle 94 coplanar with the end wall 63 and having diametrically opposite openings 94a via which provide for ready discharge of rejects.

Mounted within the drum and extending from the inlet end of the drum to the discharge end of the cylindrical extension 66 is a rotor 96 having equally spaced, axially extending blades or vanes 97 projecting radially from a hollow rotor shaft 98. The blades 97 are located and reinforced by spaced radial flanges 99. Downstream from the centre of the rotor, the shaft 98 is fitted with spray nozzles 98a which are supplied with water through the hollow shaft via a rotary coupling at the end of the shaft adjacent the drum inlet.

The rotor is mounted for rotation about a substantially horizontal axis 100 inclined to the vertical plane containing the axis of rotation of the drum at an angle of inclination substantially equal to the conical angle of the drum. Its axis 100 extends from a position offset from the vertical plane at the large end of the drum and intersects the vertical plane adjacent the outside of the end wall 101 of the casing at the small end of the drum. It is disposed in a horizontal plane which is intersected by the slightly inclined axis 67 of the drum at a position within the drum.

The rotor shaft 98 projects from opposite ends of the casing and is journalled in bearings 102,103 supported on suitable platforms 104,105 mounted on the outside end walls 89,101 of the casing. The rotor is driven by an electric motor 106 mounted on the outside of the casing adjacent the small end of the drum and coupled to the rotor shaft projecting from the bearing 103 by means of a pulley and belt transmission. The motor 106 has a three-groove pulley 107 fastened to its shaft and coupled to a similar pulley 108 fastened to the projecting end of the rotor shaft by V-belts 109.

As shown in FIG. 5, the rotor 96 is located eccentrically of the rotational axis of the drum adjacent the upwardly moving side of the drum and in a position to intercept material lifted by the vanes 93 and falling from the upper region of the drum. It is spaced from the frusto-conical surface defined by the path of movement of the inner edges of the vanes so that there is a significant clearance between the rotor blades and the drum vanes and no shearing action is produced between the blades and the vanes. For preferred operation, the rotor is arranged to rotate in the opposite direction to the drum, as indicated by the arrows 95 and 110 in FIG. 5.

In normal continuous use of the apparatus shown in FIG. 1, waste paper products, usually in bale form, are charged into the tub along with enough water to provide a pulpable total solids content, usually about 4–8%. As soon as the pulper has been operating long enough to reduce some of the paper to essentially defibered condition, i.e. to particle sizes which pass through extraction plate 20, the extraction valve 25 is opened to withdraw extracted stock from chamber 22 under plate 20. Additional furnish, i.e. waste paper and water, is added at the rate necessary to maintain the consistency of the suspension in the tub in the desired percentage range, and water, either make-up water or recycled white water from a thickener or screen downstream, is continuously added, preferably by way of the inlet 38 in the lower part of the junk remover tower 31, at the proper rate to maintain the desired liquid level in the pulper tub.

When the extraction valve 25 is opened to initiate withdrawal of extracted stock from the pulper, the weir plate 41 is lowered to initiate overflow from the junk remover tower 31. The open position of the weir plate 41 is located to maintain a sufficiently lower liquid level in the tower than in the pulper tub to induce continuous flow of lightweight contaminants into the tower by way of the chute 35, as a result of the higher effective head in the pulper tub. This overflow will include substantial quantities of undefibered pieces of paper, particularly wet strength paper, as well as pieces of plastics sheet and film and other lightweight contaminants, and this flow will be delivered to the inlet end of the rotary screening machine 50 of the invention.

In the rotary screening machine, the drum 60 rotates relatively slowly, e.g. 25 RPM, while the rotor 96 rotates more rapidly, e.g. 500 RPM. The relatively slowly moving vanes 93 within the drum continuously lift solids material from the lower region of the drum up to a height at which it falls off the vanes back towards the lower part of the drum. With the rotor positioned as shown, however, material falling from the successive vanes usually drops on to the rotor and the relatively rapidly moving rotor blades hurl it back against the inner surface of the drum.

This action may occur several times on a given piece of undefibered paper, and the resulting multiple impacts quickly break it down into particles small enough to pass through the drum perforations into the trough 90, and then by way of the tank 54, pump 51 and line 52 back to the pulper tub 10. The rotor nozzles 98a produce radial sprays which serve as hydraulic baffles to slow down the longitudinal travel of the solids material over the downstream half of the drum. Control of the speed of travel of the material through the drum, and hence the amount of processing of the material, can also be achieved by adjusting the angle of the drum, for example, with the aid of jacking screws (not shown) located beneath the casing 60.

For satisfactory operation, it is important that any pool of stock in the trough 90 should not substantially immerse the bottom of the drum. It should not immerse the bottom of the drum for more than its upstream half.

Whilst the action of the screening machine defibers or deflakes the paper products, since the rotor blades and drum vanes are dimensioned and positioned to establish a significant space therebetween, e.g. 13 cms (5 inches) at the closest, there is minimal tendency for comminution of non-paper solid contaminants in the slurry, and they progress to the small end of the drum for discharge from the machine with substantially no change in their physical characteristics other than the separation therefrom of paper originally adhering thereto, for example, the paper constituents of plastics coated paper or board. It is therefore possible to increase the capacity of the machine of the invention compared with competitive apparatus, because it is pratical to use somewhat larger drum perforations than in the case of a deflaker or comparable apparatus wherein the contaminant materials are also subject to comminution along with the paper.

Whilst particular embodiments have been described, it will be understood that modifications can be made without departing from the scope of the invention. For example, the rotary screening machine is not limited to use with a pulper of the type described above and is applicable to the treatment of contaminated paper slurries from any source. Moreover, it may be used as a substitute for a conventional deflaker, in which case the normal tailing screen can be eliminated because the machine of the invention serves as its own screen. All that is necessary for such use of the machine are suitable supply and discharge connections, with the accepted stock being handled in accordance with conventional techniques.

Moreover, whilst the weir plate 41 is particularly described above as being controlled by a fluid pressure cylinder 43, it will be evident to an informed reader that it may alternatively be controlled by any other suitable means, such as, an electric motor.

I claim:

1. Apparatus for treating a liquid suspension of paper-making material mixed with a large proportion of plastic sheet material to defiber and separate the paper-making material from the plastic, comprising:
    a. casing means including a bottom part forming a collecting trough,
    b. a drum disposed in said casing means, said drum extending along and being rotatable about a generally horizontal central axis and being open at its axial ends, said drum being frusto-conical in shape so that the opening at one axial end of the drum is larger than the opening at the other axial end of said drum, the larger end constituting an inlet end for delivering said liquid suspension to said drum,
    c. said drum including a wall of circular cross-section, said wall extending along a generally horizontal central axis, said wall being open at its axial ends and there being multiple perforations in said wall along substantially the entire length of said wall,
    d. said drum having a plurality of generally axially arranged vane members projecting radially inwardly from said wall along substantially the entire length of said wall,
    e. means supporting said drum for rotation about the central axis of said drum,
    f. inlet means for receiving a liquid slurry of papermaking material and plastic contaminants from a pulper and delivering such slurry to one end of said drum,
    g. means forming a discharge outlet from an end of said drum opposite and distal said one end of said drum arranged to provide for continuous discharge from said drum of solid materials too large to pass through said perforations,
    h. means for rotating said drum about the central axis of said drum to cause said vane members to lift solid materials from said slurry to an upper region in said drum from which upper region said materials fall downwardly,
    i. a rotor mounted to extend within said drum for rotation about a horizontal axis offset from said central axis of said drum and inclined with respect to a vertical plane that contains said central axis of said drum, said axis of said rotor being inclined to said vertical plane at an angle of inclination that is substantially equal to the angle of frusto-conical taper of said drum so that said axis of said rotor is substantially parallel to a line containing a line segment formed by the intersection of a horizontal plane with an inner surface of said drum,
    j. said rotor being of a length equal to a substantial portion of the length of said drum and having radially projecting blades extending axially along said rotor for substantially all of said length of said rotor, said rotor being disposed above the central axis of said drum and adjacent to the upwardly moving side of said drum,
    k. drive means for rotating said rotor to cause said blades to impel said solid materials dropping thereon from said vane members back against said drum wall to assist defibering of the paper making constituents to small particles capable of passing through said perforations into surrounding space within said casing means for collection in and removal from said trough,
    l. said rotor having its maximum diameter such as to provide significant space between said rotor blades and said vane members assuring minimum tendency for comminution of the plastic constituents of said solid materials, and
    m. shower means within said drum for assisting said small particles to pass through said perforations.

2. The apparatus claimed in claim 1, wherein said rotor extends along a substantial portion of the length of said drum from adjacent the inlet end of the drum.

3. The apparatus claimed in claim 1, wherein said drum has hollow cylindrical extensions projecting axially from opposite ends of said drum and is mounted for rotation on wheels disposed adjacent opposite ends of said drum and engaging said cylindrical extensions, and annular baffle means projects radially into said drum from said wall of said drum between said wall and said cylindrical extension at a discharge outlet of said drum, said baffle means having diametrically opposite openings therein, and said rotor includes a shaft projecting from opposite ends of said rotor and journalled in bearings mounted outside said drum, and spray nozzle means connected to a liquid source for producing an hydraulic baffle within said drum.

4. The apparatus claimed in claim 1, wherein annular baffle means project radially into said drum from said wall adjacent and spaced inwardly of said drum from said discharge outlet, said baffle means having at least one opening therein providing for discharge of solid materials from said drum.

5. The apparatus claimed in claim 1, wherein said rotor includes a hollow shaft, and said shower means comprises nozzle means carried by said hollow shaft for supplying radial sprays of water from within said shaft to an interior of said drum which serve as hydraulic baffles to slow down an travel of solid materials toward said discharge outlet, and means for supplying water to the interior of said hollow shaft for discharge by said nozzle means.

6. The apparatus claimed in claim 5 wherein said nozzle means are located within a half of said drum adjacent said discharge outlet, and further comprising means for limiting a level of liquid in said trough to a level below a level of liquid present in a downstream half of said drum.

* * * * *